United States Patent
Taras et al.

(10) Patent No.: US 9,358,859 B2
(45) Date of Patent: Jun. 7, 2016

(54) TRANSPORT REFRIGERATION SYSTEM POWERED BY DIESEL ENGINE WITH PRESSURIZED COMBUSTION AIR

(71) Applicant: Carrier Corporation, Farmington, CT (US)

(72) Inventors: Michael F. Taras, Fayetteville, NY (US); Russell G. Lewis, Manlius, NY (US); Nader S. Awwad, Baldwinsville, NY (US); Benjamin E. Ferguson, Cazenovia, NY (US); John T. Steele, Marcellus, NY (US)

(73) Assignee: CARRIER CORPORATION, Farmington, CT (US)

( * ) Notice: Subject to any disclaimer, the term of this patent is extended or adjusted under 35 U.S.C. 154(b) by 168 days.

(21) Appl. No.: 14/361,317

(22) PCT Filed: Oct. 12, 2012

(86) PCT No.: PCT/US2012/059895
§ 371 (c)(1),
(2) Date: May 29, 2014

(87) PCT Pub. No.: WO2013/081729
PCT Pub. Date: Jun. 6, 2013

(65) Prior Publication Data
US 2014/0331706 A1    Nov. 13, 2014

Related U.S. Application Data

(60) Provisional application No. 61/565,074, filed on Nov. 30, 2011.

(51) Int. Cl.
*B60H 1/32* (2006.01)
*B60P 3/20* (2006.01)
(Continued)

(52) U.S. Cl.
CPC ............... *B60H 1/32* (2013.01); *B60H 1/3232* (2013.01); *B60P 3/20* (2013.01); *F25B 27/00* (2013.01); *F25D 11/003* (2013.01); *F25B 2327/001* (2013.01)

(58) Field of Classification Search
CPC ... B60H 1/3204; B60H 1/00207; B64D 13/08
USPC .............. 62/243, 236, 467, 402, 87, 116, 61
See application file for complete search history.

(56) References Cited

U.S. PATENT DOCUMENTS

| | | | | |
|---|---|---|---|---|
| 3,234,738 A | * | 2/1966 | Cook | F01K 17/005 60/641.1 |
| 4,419,866 A | | 12/1983 | Howland | |

(Continued)

FOREIGN PATENT DOCUMENTS

| | | |
|---|---|---|
| CN | 201209985 Y | 3/2009 |
| GB | 910896 A | 11/1962 |
| GB | 2450957 A | 1/2009 |

OTHER PUBLICATIONS

International Preliminary Report on Patentability for application PCT/US2012/059895, Jun. 12, 2014, 6 pages.

(Continued)

*Primary Examiner* — Melvin Jones
(74) *Attorney, Agent, or Firm* — Cantor Colburn LLP

(57) ABSTRACT

A transport refrigeration system includes a diesel engine equipped with a combustion air pressurization device, such as a turbo-charger or a supercharger. The diesel engine powers at least one component associated with the transport refrigeration system, such as a refrigeration compressor or an air-moving device.

9 Claims, 1 Drawing Sheet

(51) Int. Cl.
*F25B 27/00* (2006.01)
*F25D 11/00* (2006.01)

(56) References Cited

U.S. PATENT DOCUMENTS

| | | | |
|---|---|---|---|
| 4,899,549 A | 2/1990 | Berge et al. | |
| 4,977,752 A | 12/1990 | Hanson | |
| 5,140,826 A | 8/1992 | Hanson et al. | |
| 5,916,253 A | 6/1999 | Amr et al. | |
| 6,171,380 B1 | 1/2001 | Wood et al. | |
| 6,220,033 B1 * | 4/2001 | Labinov | F02C 1/10 60/649 |
| 6,223,546 B1 | 5/2001 | Chopko et al. | |
| 6,233,939 B1 * | 5/2001 | Ngo-Beelmann | F01K 7/38 60/653 |
| 6,233,940 B1 * | 5/2001 | Uji | F01K 21/047 60/39.01 |
| 6,321,550 B1 | 11/2001 | Chopko et al. | |
| 7,614,242 B1 | 11/2009 | Saborio | |
| 7,614,368 B2 * | 11/2009 | Gehres | F01P 7/16 123/41.08 |
| 2009/0250190 A1 | 10/2009 | Siegenthaler | |
| 2010/0000002 A1 | 1/2010 | Reason et al. | |
| 2010/0154449 A1 | 6/2010 | Stover et al. | |

OTHER PUBLICATIONS

European Office Action for application EP 12778585.5 dated Jan. 29, 2016, 5 pages.

* cited by examiner

TRANSPORT REFRIGERATION SYSTEM POWERED BY DIESEL ENGINE WITH PRESSURIZED COMBUSTION AIR

CROSS-REFERENCE TO RELATED APPLICATION

Reference is made to and this application claims priority from and the benefit of U.S. Provisional Application Ser. No. 61/565,074, filed Nov. 30, 2011, and entitled TRANSPORT REFRIGERATION SYSTEM POWERED BY DIESEL ENGINE WITH PRESSURIZED COMBUSTION AIR, which application is incorporated herein in its entirety by reference.

BACKGROUND OF THE INVENTION

This invention relates generally to transport refrigeration systems and, more particularly, to improving system efficiency and reducing fuel consumption of an onboard diesel engine powering components of the transport refrigeration system.

Mobile refrigerated cargo systems, such as refrigerated trucks, refrigerated trailers and intermodal refrigerated containers are commonly used to transport perishable cargo, such as, for example, produce, meat, poultry, fish, dairy products, cut flowers, and other fresh or frozen perishable products. Conventionally, transport refrigeration systems used in connection with mobile refrigerated cargo systems include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

Commercially available transport refrigeration systems include a prime mover, typically a diesel engine, for powering the refrigerant compressor and other components, such as the condenser fans and evaporator fans, of the transport refrigeration unit. On refrigerated trucks and refrigerated trailers, the transport refrigeration system, commonly referred to as a reefer, is mounted to the truck or trailer and includes a prime mover as an integral component. On intermodal containers, a genset is mounted to the transport refrigeration unit carried on the container for powering the refrigerant compressor and other components of the transport refrigeration unit whenever the container is not connected to an external power supply. The genset includes a prime mover and an electric generator powered by the prime mover.

Diesel engines used as prime movers on transport refrigeration systems generally have two operating speeds, that is a high RPM speed, such as 2200 RPM, and a low RPM speed, such as 1400 RPM. In operation, the diesel engine is operated at high speed during pulldown of the temperature within the cargo space to a desired temperature set point and at low speed during the temperature maintenance mode. During standstill, that is when the refrigerant compressor is not operating, the diesel engine is typically idling at low speed. The diesel engine is generally designed to meet the power needs of the transport refrigeration system during operation at maximum capacity, such as during the temperature pulldown mode, with efficient fuel consumption. Therefore, during the temperature maintenance mode and standstill mode, the diesel engine is operating at lower efficiency and with increased fuel consumption.

SUMMARY OF THE INVENTION

It would be desirable to reduce the size and weight of the diesel engine to reduce overall fuel consumption in a transport refrigeration system and to reduce total carbon output, that is emissions into the atmosphere of carbon compounds.

A transport refrigeration system for providing temperature conditioned air to a cargo storage space of a truck, trailer, intermodal container or other transport container, includes a refrigerant compression device and a prime mover for driving the refrigerant compression device. The prime mover comprises a diesel engine equipped with a combustion air pressurization apparatus, such as one of a turbo-charger and a supercharger. In an embodiment, the refrigerant compression device is directly driven by the turbo-charged or supercharged diesel engine. In an embodiment, an electric generator supplies electric power to drive the refrigerant compression device, the electric generator being directly driven by the turbo-charged or supercharged diesel engine.

BRIEF DESCRIPTION OF THE DRAWINGS

For a further understanding of the disclosure, reference will be made to the following detailed description which is to be read in connection with the accompanying drawing, where.

DETAILED DESCRIPTION OF THE INVENTION

Figure 1:
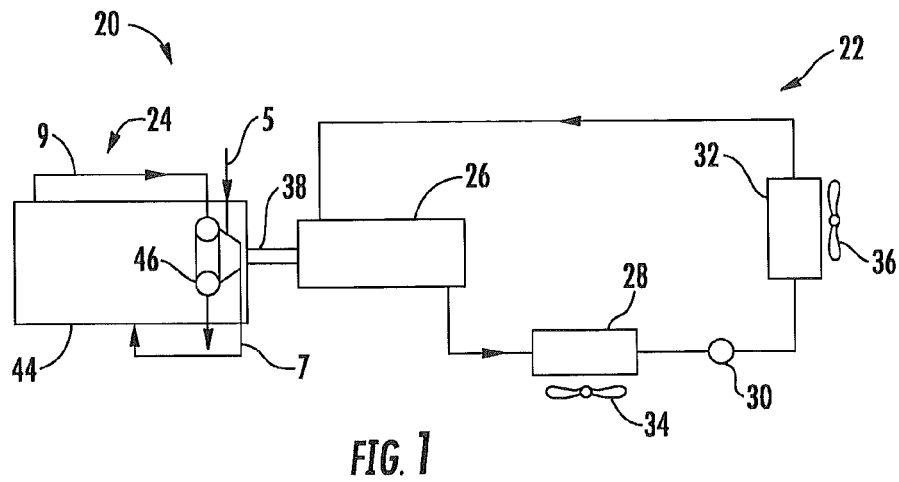
FIG. 1 is a schematic illustration of an exemplary embodiment of a transport refrigeration system incorporating a turbo-charged diesel in accordance with an aspect of the disclosure.

The exemplary transport refrigeration system 20 depicted in FIG. 1 includes a refrigeration unit 22 and a prime mover 24. The refrigeration unit 22 functions, under the control of the controller (not shown) and in a conventional manner, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 26, a refrigerant heat rejection heat exchanger 28, an expansion device 30, and a refrigerant heat absorption heat exchanger 32 connected in refrigerant flow communication in a closed loop refrigerant circuit and arranged in a conventional refrigeration cycle. The refrigeration unit 22 also includes one or more fans 34 associated with the refrigerant heat rejection heat exchanger 28 and one or more fans 36 associated with the refrigerant heat absorption heat exchanger 32. It is to be understood that other components (not shown) may be incorporated into the refrigerant circuit as desired, including for example, but not limited to, a suction modulation valve, a receiver, a filter/dryer, an economizer circuit, an hot gas defrost circuit, an electric resistance heater.

The refrigerant heat rejection heat exchanger 28 may operate either as a refrigerant condenser, such as if the refrigeration unit 22 is operating in a subcritical refrigerant cycle or as a refrigerant gas cooler, such as if the refrigeration unit 22 is operating in a transcritical cycle. The refrigerant heat absorption heat exchanger 32 functions as a refrigerant evaporator. The evaporator fan(s) 36 operate to pass air drawn from the temperature controlled cargo box through the evaporator in heat exchange relationship with the refrigerant passing through the evaporator to cool the air. The cooled air is supplied back to the temperature controlled cargo box. Fresh air can be mixed with the cargo box air prior passing through the evaporator.

The refrigerant compression device 26 may comprise a single-stage or multiple-stage compressor such as, for example, a reciprocating compressor or a scroll compressor. The compression device 26 has a compression mechanism (not shown) that may be driven directly by the prime mover 24 through a mechanical coupling or that may be driven by an electric motor. In the embodiment depicted in FIG. 1, for example, the compression mechanism of the refrigerant compression device 26 is coupled directly to and driven by the drive shaft 38 of the prime mover 24. It is to be understood, however, that the compression mechanism of the refrigerant compression device 26 may be mechanically coupled to the prime mover 24 by a belt drive or other drive coupling to connect the drive shaft of the prime mover 24 to a driven shaft of the refrigerant compression device. Further, the condenser fan(s), the evaporator fan(s), an alternator or other components of the transport refrigeration unit 22 or transport refrigeration system 20 may be driven off the prime mover 24 by belt drive, chain drive or otherwise. As a further example, in the embodiment depicted in FIG. 2, for example, the compression mechanism of the refrigerant compression device 26 is driven by an electric motor 40 that is supplied with electricity from a generator 42 mechanically coupled to and driven by the drive shaft 38 of the prime mover 24.

Figure 2:
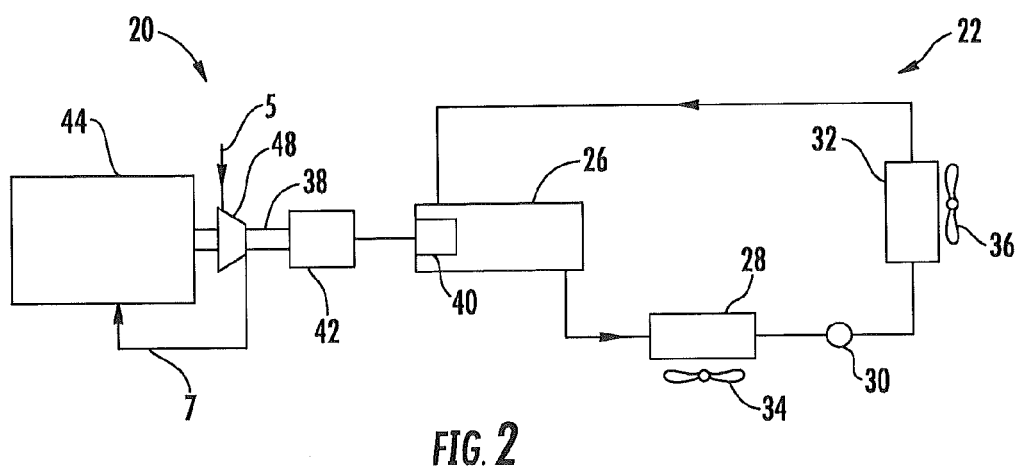
FIG. 2 is a schematic illustration of another exemplary embodiment of a transport refrigeration system incorporating a supercharged diesel engine in accordance with an aspect of the disclosure.

In the transport refrigeration system 20 disclosed herein, the prime mover 24 comprises a diesel engine 44 equipped with a combustion air pressurization apparatus such as a turbo-charger 46, as illustrated schematically in FIG. 1, or a supercharger 48, as illustrated schematically in FIG. 2. The turbo-charger 46 and the supercharger 48 operate to boost the pressure of atmospheric air 5 to supply pressurized combustion air 7 for use as combustion air for combusting fuel in the engine 44. In the turbo-charged diesel engine embodiment, the turbo-charger 46 is driven by the exhaust gases 9 from the diesel engine 44 to pressurize the combustion air being supplied to the cylinders of the diesel engine 44. In the supercharged diesel engine embodiment, the supercharger 48 is mounted to and driven by the shaft 38 of the engine 44 to pressurize atmospheric air 5 to supply the pressurized combustion air 7. As a result of combusting the fuel in pressurized air, the efficiency of the combustion is increased and the power output of the engine is increased. Additionally, fuel consumption is reduced and exhaust emissions are reduced.

In transport refrigeration systems, unlike stationary refrigeration systems, weight and size of components are major design considerations due to limited available space and fuel economy considerations. Since the turbo-charged or supercharged diesel engine 44 can operate at a higher speed when the turbo-charger 46 or the supercharger 48 is engaged, the refrigerant compression device 26 can be operated at a higher speed. Being operational at a higher speed, particularly when operating at maximum capacity output, enables the size, and therefore the weight of the compressor to be reduced. Additionally, the turbo-charged or supercharged diesel engine 44 will itself be more compact as compared to a conventional diesel engine not equipped with a turbo-charger or supercharged producing the same power output.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A transport refrigeration system for providing temperature conditioned air to a cargo storage space of a truck, trailer, intermodal container or other transport container, the transport refrigeration system including a prime mover for powering at least one component associated with the transport refrigeration system, characterized in that the prime mover comprises a diesel engine equipped with a combustion air pressurization apparatus;
wherein the prime mover comprises a diesel engine equipped with a turbo-charger; and the transport refrigeration system includes:
an electric generator for supplying electric power to drive a refrigerant compression device, the electric generator being directly driven by said turbo-charged diesel engine.

2. The transport refrigeration system as recited in claim 1 wherein the at least one component powered by the prime mover comprises a refrigerant compression device directly driven by said turbo-charged diesel engine.

3. The transport refrigeration system as recited in claim 1 wherein the at least one component powered by the prime mover comprises at least one air-moving device associated with the transport refrigeration system.

4. The transport refrigeration system as recited in claim 1 wherein said turbo-charged diesel engine and said electric generator comprise a genset.

5. The transport refrigeration system as recited in claim 1 further characterized in that the prime mover comprises a diesel engine equipped with a supercharger.

6. The transport refrigeration system as recited in claim 5 wherein the at least one component powered by the prime mover comprises a refrigerant compression device directly driven by said supercharged diesel engine.

7. The transport refrigeration system as recited in claim 5 wherein the at least one component powered by the prime mover comprises at least one air-moving device associated with the transport refrigeration system.

8. The transport refrigeration system as recited in claim 5 further including an electric generator for supplying electric power to drive a refrigerant compression device, the electric generator being directly driven by said supercharged diesel engine.

9. The transport refrigeration system as recited in claim 6 wherein said supercharged diesel engine and said electric generator comprise a genset.

* * * * *